United States Patent [19]

Geddes

[11] Patent Number: 4,647,989
[45] Date of Patent: Mar. 3, 1987

[54] VIDEO CASSETTE SELECTION MACHINE

[76] Inventor: Eric J. Geddes, 31 Arden Park, Detroit, Mich. 48202

[21] Appl. No.: 476,729

[22] Filed: Mar. 18, 1983

[51] Int. Cl.$^4$ ................................................ G11B 5/00
[52] U.S. Cl. ...................................... 360/55; 358/335; 360/92; 369/30; 369/34; 235/381
[58] Field of Search .................. 358/335, 115; 360/69, 360/71, 55, 92; 369/30, 176, 178, 34, 69; 235/381

[56] References Cited

U.S. PATENT DOCUMENTS

| | | | |
|---|---|---|---|
| 2,318,118 | 5/1943 | Warner et al. | 369/52 X |
| 3,718,906 | 2/1973 | Lightner | 235/381 |
| 3,879,758 | 4/1975 | Pyles | 360/92 |
| 3,990,710 | 11/1976 | Hughes | 369/30 X |
| 4,023,207 | 5/1977 | Cook | 360/92 |
| 4,108,365 | 8/1978 | Hughes | 369/52 X |
| 4,133,013 | 1/1979 | Fisher | 360/92 |
| 4,141,045 | 2/1979 | Sheehan | 360/92 X |
| 4,145,724 | 3/1979 | Meddling et al. | 360/92 |
| 4,173,024 | 10/1979 | Miller | 358/255 X |
| 4,224,644 | 9/1980 | Lewis et al. | 360/72.2 |
| 4,300,040 | 11/1981 | Gould et al. | 235/381 |

FOREIGN PATENT DOCUMENTS 5732439   8/1980   Japan ...................................... 369/30

Primary Examiner—Robert L. Richardson

[57] ABSTRACT

The disclosure being made by the Video Cassette Selection Machine is that of an automated library retrieval system of video tape cassettes combined with the additional features of a complete playback system which include: a cassette player, T.V. unit(s), and speaker system(s). Additional features provided are the ability to exchange the contents of the cassette library with new cassettes in order to expand the scope of the cassette library. A machine memory allows the storage of a number of input selections to be recorded with the machine. The inclusion of a currency monitor requires a monitary compensation.

The complete system is, therefore, one that upon receiving monitary compensation, the selection of one or more video tape cassettes is made from a library of video cassettes. The selected cassettes is then automatically obtained from the cassette library and placed into a cassette player which then communicates the information contained on the cassette to appropriate T.V. and speaker units for the consumption of the selector of the cassette.

1 Claim, 7 Drawing Figures

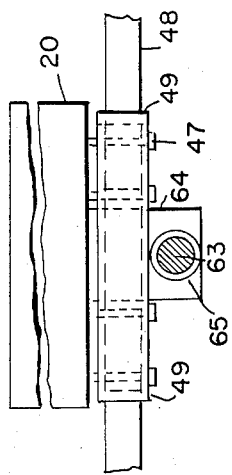
FIG. 4
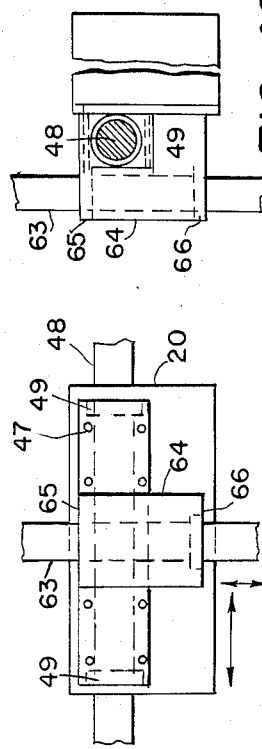
FIG. 4B
FIG. 4A
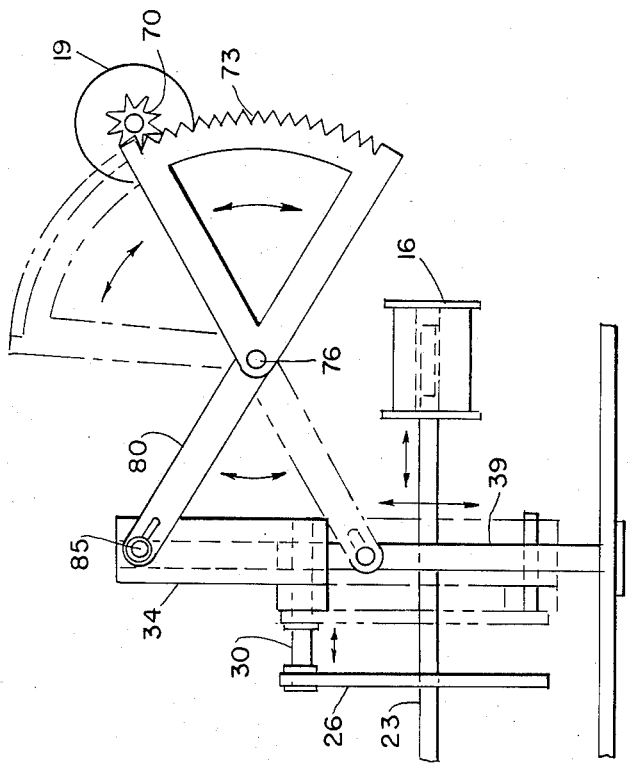
FIG. 5
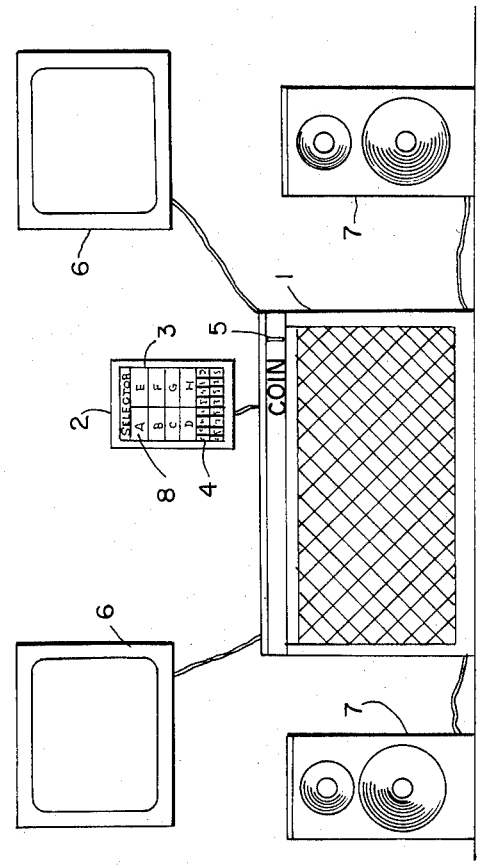
FIG. 1

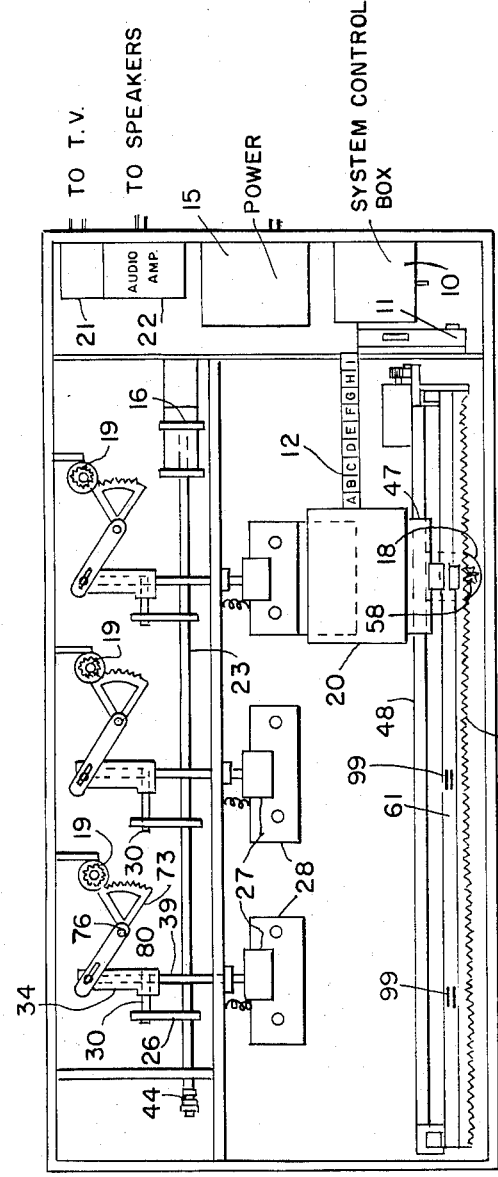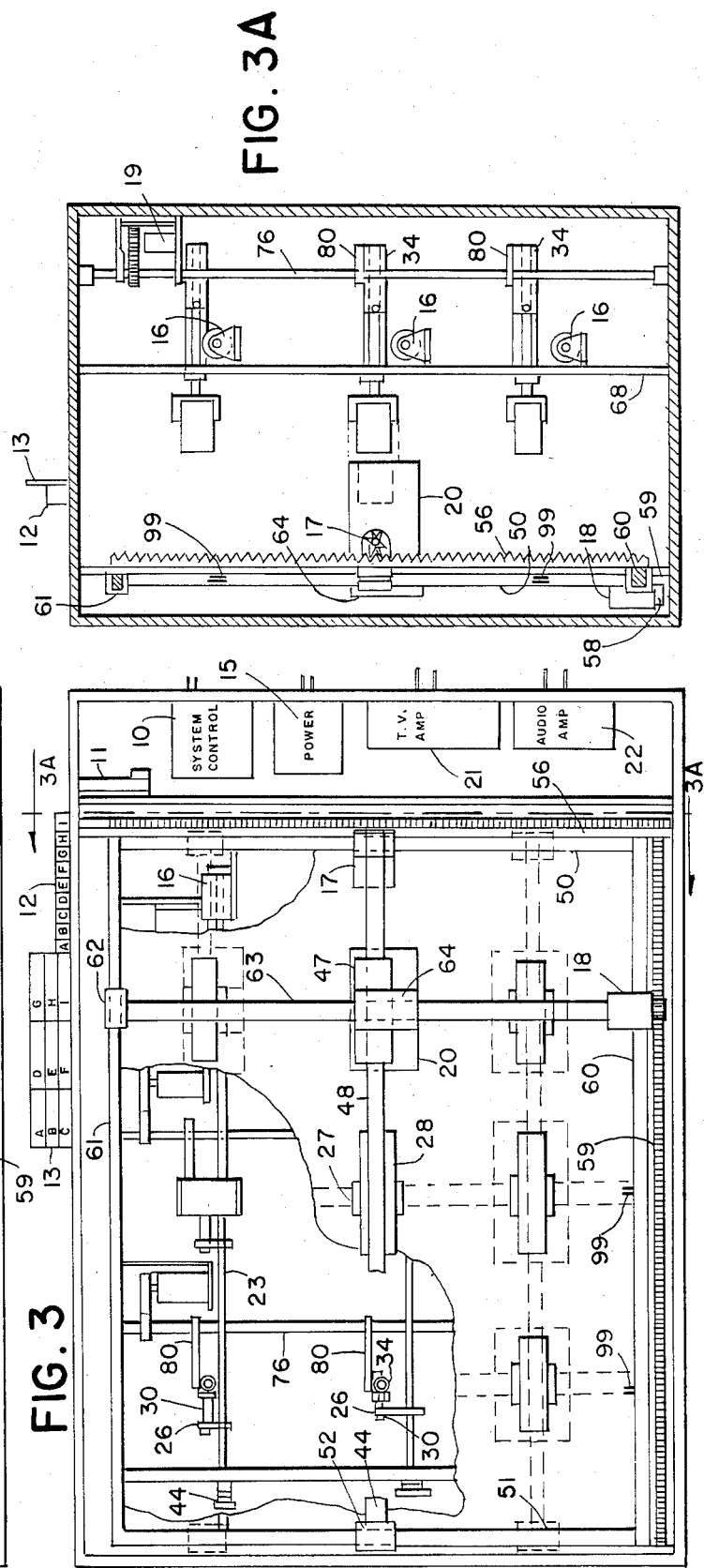

VIDEO CASSETTE SELECTION MACHINE

SUMMARY OF INVENTION

The present invention is a machine that provides an automated retrieval and playback system to an aggregate collection of pre-recorded video tape cassettes arranged in a cassette library. This allows a customer to select and receive the complete playback of the entire video cassette of his choice contained in the cassette library by automated means and without alteration of the cassette library. The machine includes a coin mechanism or currency monitor compensation. The cassette library is composed in a manner that allows random access to all of the singular cassettes located therein. The machine includes a catalog of titles of all the cassettes located in the cassette library as well as a selection device, such as a push-button keyboard, that allows the customer to select the desired cassette by title and input the selection by coded signal directly to the machine system control. In one embodiment of the machine, the coin mechanism; catalog; and selection keyboard are located together in a separate enclosure and connected to the machine control system by wiring. This allows the customer selection portion of the machine to be conveniently located to the customer, much in the manner as the selection portion of the current "Jukebox" as located in restaurants.

Having received the signal to allow selection from the coin mechanism and having received the coded selection signal from the selection keyboard, the machine system control performs the necessary functions of locating the selected cassette within the cassette library and placing voiced cassette in conjunction with video cassette playback device, so that playback of the complete selected cassette proceeds. The video portion of the playback signal is supplied to to whatever T.V. viewing system has been provided for display, be it singular or multiple T.V. units. In a similar manner, the audio portion of the cassette signal is supplied to the provided audio system, be it stereo or mono in nature. Upon completion of the playback, the cassette is rewound automatically. The machine control is signaled and performs the functions returning the cassette to its original position within the cassette library and additional selections may proceed.

Included in the machine control is the provision for "memory" with regards to selection storage, so that a random sequence of selections can be stored in the machine thus avoiding the necessity of waiting for the complete playback procedure to finish before additional selection is made. The machine is designed in such a fashion as to allow easy exchanges of cassettes within the cassette library and corresponding catalog of titles, thus allowing the machine to be provided with new cassettes of material at the discretion of the owner or operator.

DESCRIPTION OF THE DRAWINGS

FIG. 1 shows the complete Video Tape Selection Machine, with T.V. display units in a removed position, customer selector in removed position, and audio presentation adapted for stereo sound reproduction.

FIGS. 3(a) and 3(b) are top and front views of the Video Tape Selection Machine, showing the location of the various electrical and mechanical elements with Sec. AA being a sectional end view showing the relation of the tape playback device to the cassette library and cassette removal elements.

FIGS. 4(a) and 4(b) are engineering drawings detailing the cross arm connection between the verticle and horizontal position arms and the cassette playback device.

FIG. 5 shows the operational movements of the elements that comprise the cassette removal portion of the cassette selection procedure.

DESCRIPTION OF THE PREFERRED EMBODIMENT

Figure 2:
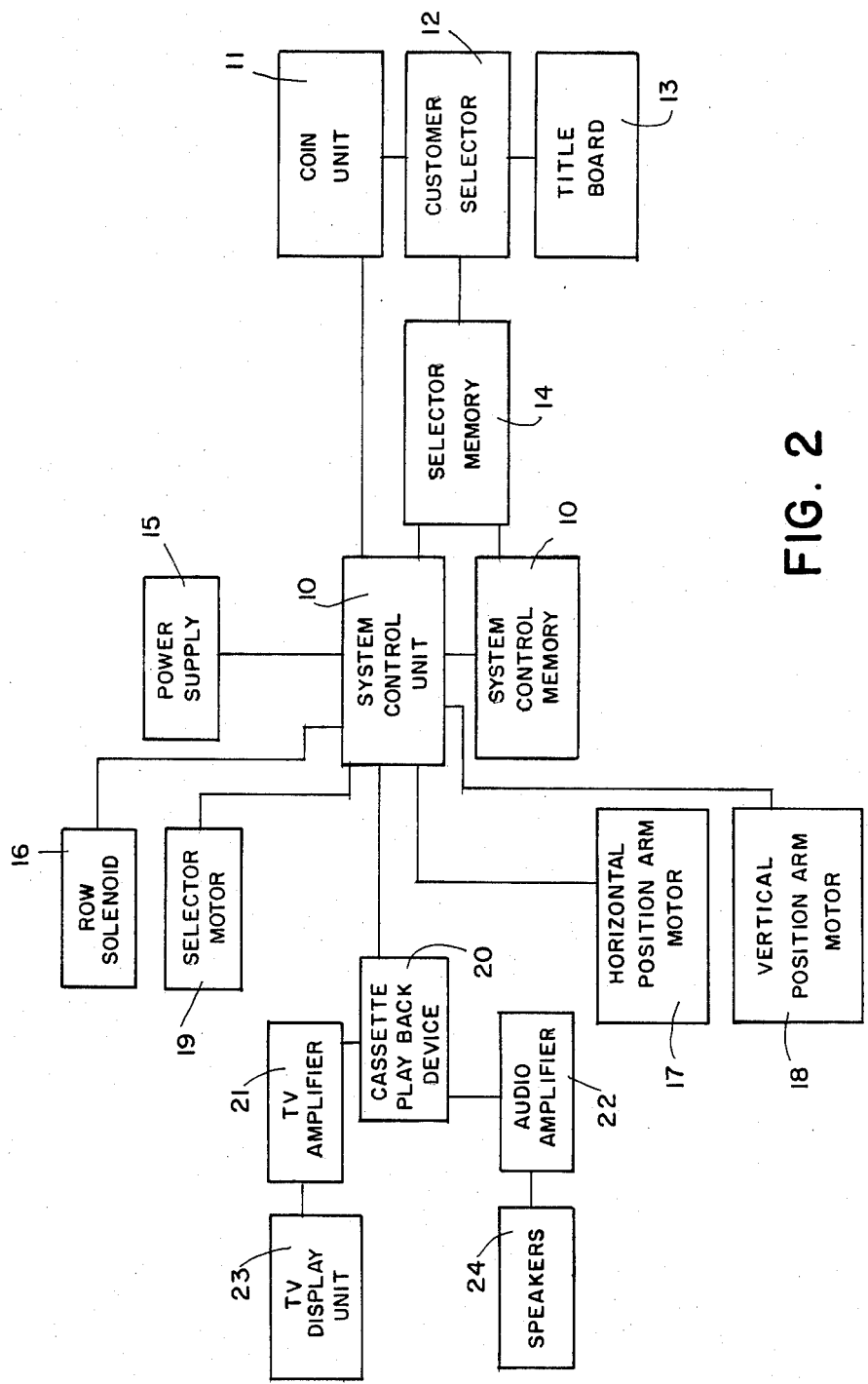
FIG. 2 is a block diagram representation of the electrical elements of the machine and how they are related to perform the results of cassette selection and playback.

The present invention is that of a library of video tape cassettes, combined with an automated method of selecting, in random order, any of the singular cassettes contained within the cassette library, automatically placing the selected cassette in conjunction with a cassette playback device, displaying the pre-recorded program material contained on the cassette directly to the customer, in its entirety, through either singular or multiple T.V. units located remotely from the cassette library, reproducing the sound from the cassette by either monaural or stereophonic means by speakers either internal or external to the cassette library, automatically rewinding and replacing the cassette back in its original position within the cassette library, allowing the above procedure to proceed through monitory compensation (coin operation), directly to the machine that is complete with "memory" with regards to selections paid for and made.

A typical video cassette selection system is represented in FIG. 1. Enclosure 1 contains the video cassette library with complete selection systems, systems control, video cassette playback device, and coin unit 5. Connected directly to the system control unit contained in enclosure 1 is the customer selector 2. This unit contains the title board 3 which identifies the program material that has been pre-recorded onto each of the individual cassettes located in the cassette library. This board further supplies a selection ordinate 8 that is used as input to the cassette ordinate selector 4, a set of push-buttons located in the customer selector 2. This supplies a uniquely associated ordinate to the system control unit by way of the selection memory located in the library enclosure 1 that identifies the exact cassette in the cassette library. T.V. units 6, as well as speaker systems, are connected directly to the cassette playback system located in the library enclosure 1 and provide the means upon which the video portion of the playback signal is viewed and the audio portion is heard. The coin unit 5 is the currency monitor by which the machine control system determines that the proper amount of compensation has been made for each selection desired.

The operation of the selection machine would be as follows: The customer would deposit the required coin or coins as would be required per selection into the coin unit 5. The coin unit would signal the system control unit that cassette selection may proceed. The system control unit lights a lamp that informs the customer to "make selection" while at the same time activating the cassette ordinate selector 4. The customer makes the selection of the cassette of choice and inputs the proper selection ordinate 8 by activating the proper pushbuttons of the cassette ordinate selector 4. The ordinate signal is entered into the selector memory which is a portion of the system control memory which is a part of the overall system control unit. The selector memory passes the ordinate information to the system control memory which matches the input ordinate with a machine coordinate that identifies the row and column position of the selected cassette within the cassette library. The system control unit then performs the functions necessary to place the selected cassette into the cassette playback device. The playback device is activated upon receipt of a cassette and supplies the proper video signal to the T.V. unit 6 or units 6 provided, as well as supplying the audio signal to the speaker system 7. The customer receives the complete playback of the program material contained on the selected cassette. Upon completion of the cassette playback, the cassette itself signals the playback device and automatic rewind is completed. The playback device signals the system control, the cassette is completed, and the system control causes the removal of the cassette from the playback device and returns the cassette to its proper location in the cassette library. The system control checks to see if there are selections remaining in memory to be played back. If there are, the selection machine continues to make playbacks until there are none, at which time the system control checks to see if there are additional selection choices to be made, and if not, it places the machine in standby mode until the coin unit 5 is again activated.

A more detailed description of the eternal elements of the Video Tape Selection Machine is now given with references to the electrical control portion of the operation given in FIG. 2, a block diagram of the electrical elements of the selection machine. A worker skilled in the art will understand the operation of each of these elements through the description given here to exactly that function(s) each element will be required to perform. This will further allow a worker skilled in the art to readily understand how these elements are functionally interconnected to provide an operative control system for the mechanical elements of the selection machine.

Referring to FIG. 2, the selection machine contains its own internal power source 15 that supplies both A/C power tape playback device 20, T.V. amplifier 21, T.V. units 23, audio amplifiers 22, as well as D/C power for motors 17, 18, 19, solenoids 16, systems control 10, coin unit 11, and selector 12. The selection machine contains a coin unit 11. This unit is of standard design that is well known to one skilled in the art. Its function is to screen and count coins deposited and send said information to the system control 10 for tabulation. Upon receipt of a signal from the coin unit 11, that coin input has been receiving, the system control unit 10 activates the selector 12, which is composed of a signal lamp to notify the customer that selection may proceed and also a set of pushbuttons that allows the customer to input the proper ordinate code, obtained from the title board 13, corresponding to the title of the desired program material. This code is input to the selector memory 14, which is directly connected to the system control memory portion of system control 10. The function of the selector memory is to store, in selected random order, input selection ordinates received from the selector 12, and to dispense these input ordinates to the system control memory as they are required by the system control 10 to provide additional playback of cassette. This process continues until all selections stored in memory have been processed. The system control memory is a permanent memory located in the system control unit 10, in which the row and column coordinates used by the system control unit 10, locate the row and column position of the selected cassette, within the cassette library.

The system control memory contains a set of four bit binary numbers that identify the row and column of every cassette located in the cassette library; the first two digits signifying the column. These numbers are uniquely associated with each ordinate input supplied from the selector memory 14, so that an ordinate selection made by title and input by the selector 12, is given a row and column coordinate location within the cassette library that can be used by the system control unit 10. The function of the system control memory is to receive the binary ordinate input number from the selector memory 14, assign the correct binary location number to that ordinate and pass that binary coordinate number onto the system control unit 10. The system control unit 10, is the central processing unit of the entire electrical system of the selection machine. Its functions are to receive input signals from the coin unit 11, tabulate the number of selections that compensation has been received for, notifying the customer through selector 12. To make the tabulated number of selections, activate the selector pushbuttons until the tabulated number of selections has been made, receive the input binary code number from the control memory for each selection, use the binary code number to determine the row and column location of the selected cassette, use the row position (half of the memory code number) to supply electric current to the proper row solenoid 16 so that the proper mechanical linkage in the selected row will be accomplished, receive an electrical binary signal from electrical contacts (FIG. 3, 99) by which it can be determined where the horizontal position is located, and compare the position arm binary number with the binary code number received from memory as to the required row containing the cassette. If the two numbers are equal, then the position arm is in the proper location and no current is passed to the horizontal position arm motor 17. If the current position location number is greater than the code number received from memory, then current is passed to the horizontal position arm motor 17 causing it to rotate in a counterclockwise fashion that causes the position arm to raise until the control unit 10 receives the binary signal from the position arm contacts, which makes the two numbers equal and the current to the motor is stopped. If the current position location number is less than the memory code number, then current is passed to the horizontal position arm motor 17 causing it to rotate in a clockwise fashion causing the arm to lower until the numbers are equal and current is stopped. Having properly positioned the horizontal position arm according to the memory code number, the control unit 10 receives the current verticle position binary number that identifies the position of the verticle position arm. Again, the current location number is compared to the memory code number received from the control memory. This time if the code number is less than the current number, current is passed causing counterclockwise rotation of the verticle position arm motor 18 and the movement of the verticle position arm is to the left. If the current position number is less than the memory code number, the rotation of the verticle position arm motor 18 is clockwise, and the movement of the position arm is to the right until the numbers are equal and the arm position is correct. The system control unit 10 has now positioned the horizontal and verticle position arms to which the cassette playback device is attached in the position indicated by the intersection of the proper row (horizontal) and column (vertical) dictated by the binary memory code number. The playback device is in a position to receive the selected cassette from the cassette library. The control unit 10 now uses the column location half of the binary code number and supplies current to the corresponding tape selector motor 19 rotating it in a clockwise manner and with the proper row solenoid 16 already activated, the proper mechanical function occurs that inserts the selected cassette into the cassette playback device, activating such electrical contacts as are required to cause the playback device to become operational and cause complete playback of the entire customer selected cassette. Upon completion of playback and automatic rewind, the system control unit 10 receives a signal from the playback device that playback is completed and passes electric current to the selector motor 19 causing it to rotate in a counterclockwise manner and therefore, removing the cassette from the playback device and returning it to its position in the cassette library. The system control unit 10 then deactivates the row solenoid 16 and either receives additional input for selection from the control memory or places the system on standby for the next input signal from the coin unit 11 that will begin the entire sequence again. The playback device 20 is a front loading video cassette player. Its function is to accept the selected cassette from the cassette library read the encoded signal contained on the magnetic tape contained within the cassette, and supply the signal to the video amplifier 21 and audio amplifier 22. The playback device 20 also receives a signal from the cassette when the magnetic tape is finished. This causes the playback device 20 to automatically rewind the tape in the cassette so the cassette always enters the playback device 20 in the start position of the tape. Upon completion of the rewind, the playback device 20 signals the system control unit 10 that the playback and rewind is complete and the system control unit 10 causes the cassette to be removed from the playback device 20 and returned to the cassette library. The playback device 20 can be of any given format, (i.e., Beta, VHS, ½ in., 8 mm, etc.) as long as it is the same compatible format as all of the cassettes located in the cassette library. The playback device 20 can be of current design as would be known by one skilled in the art as long as it is of the front loading and not the top loading design. The playback device 20 in this embodiment has been modified because current commercial designs contain many more features, (i.e., internal amplifiers, programability, fast forward, etc.) than are necessary to the playbacks supplied by the selection machine. If included, this causes the playback device to be larger and heavier than necessary. Therefore, in order to save weight and space and to ease the movement of the position arm, the signal amplifiers for both video amplification 21 and audio amplification 22 have been removed and relocated within the selection machine. All other features have been removed except rewind. These modifications will be readily understood by one skilled in the art. The playback device 20 is now a basic tape transport with read heads and rewind. The additions made to the playback device of adding switches to activate the device when a selected cassette is inserted, will be understood by one skilled in the art. The functions of video amplifier 21 is to receive the encoded video signal from the video "read head" of the playback device 20 and to process that signal in such a fashion that it can be received and used by the T.V. unit(s) 23 to provide the customer with the final video presentation of the selected cassette. The audio amplifier receives the audio signal from the audio "read head" of the playback device 20 and processes that signal so that it can be used by the speakers to provide the audio portion of the cassette presentation.

An illustrative example of specific components that would perform the necessary functions required of the electrical control portion of the Video-Cassette Selection Machine is given here with reference to U.S. Pat. No. 4,300,040. U.S. Pat. No. 4,300,040, Ordering Terminal, shows an electronic control system comprising a keyboard entry means for specification and entry of video cassette title selection through a computer interface called "system control logic," to an MSC-8001 computer. U.S. Pat. No. 4,300,040 further shows a credit card reader interfacing with said computer, as well as interface with a playback device, a character display, and a printer. The Video-Cassette Selection Machine is controlled in a like fashion. The operation and modification would be readily parent to one skilled in the art. The keyboard entry of the selection machine would be from the customer selector 12, to the computer system control unit 10, through a ram memory, the selector memory 14; both the selector memory 14, and the customer selector 12 are able to be separately addressed by the computer system control unit 10. The coin unit 11 replaces the credit card reader and interfaces directly to the computer system control unit 10 as does the customer selection notification means, this being as simple as a lamp identified as "make selection" that remains lit until all selections paid for are made. Computer system control unit 10 interface with the playback device 20, remains the same except, the required functions are—playback, rewind, and status of operation. Additional interface with the computer system control unit 10 enables the computer of unit 10 to receive status information as to the current position of the vertical and horizontal position arms by reading the encoded signal sent from the electrical contacts 99, through similar interface circuits as those used to encode signals sent from the keyboard pushbuttons. To compare the current status of the position arms with the required position of the arms according to the selection being processed, and to interface with the position arm motors 17 and 18, acquire the required positioning of the arms and the playback device. Further interfacing with the system control unit computer 10 and the row solenoid 16, as well as the selection motor 19, enables the correct cassette selection to be displaced from the cassette library and placed in conjunction with the playback device and allows replacement of the cassette to the library upon completion of playback. The core memory of the MSC-8001 computer comprising the system control unit 10, contains the operational program required to perform the necessary functions described as well as addressing the system control memory 10 in which the encoded row and column coordinates used for cassette location identification are stored.

Reference is now made to the mechanical elements that are controlled and operated by the electrical elements described. Reference to FIG. 3 shows the overall relationships and positions of the various elements of the system, both electrical and mechanical, less the T.V. units and speaker systems which are shown in FIG. 1.

FIG. 3 shows the coin unit 11, title board 13, ordinate selector 12, power supply 15, system control box 10 which contains the selector memory, system control memory and system control unit of FIG. 2. The functions of these elements have previously been given. FIG. 3 further shows the electromechanical elements. The horizontal position arm motor 17 that is used to position the horizontal (row) position arm 48 by rotating a tooth gear along a toothed track 56 in either a clockwise or counterclockwise fashion. The movement of this arm is verticle. The required direction of movement is indicated by the system control unit 10. The position arm is stabilized between two verticle control arms 50 and 51. These arms keep the position arm 48 level at all times and also contain the electrical contacts 99 that signal the system control unit 10 as to the exact row location of the position arm 48 as each row is contacted by the position arm-slide-52. The verticle position arm motor 18 and the verticle position arm 63 are shown. This motor functions in the same fashion, only the movement is horizontal not verticle. This motor drives along the toothed track 59 and is kept perpendicular to the horizontal position arm 48 by horizontal control arms 60 and 61. Such electrical contacts 99 as needed to identify the exact column (verticle) location of this arm which are located on one of these arms and contacted by the verticle position arm-slide 62.

FIG. 4 shows the intersection of the horizontal and vertical arms in detail. The horizontal position block 47 is located around the horizontal position arm 48. It is allowed to move along the entire length of the arm on linear bearings 49, thereby, keeping friction to a minimum. Its movement is controlled by movement of the verticle position block 64 which is attached to it. The verticle position block 64 surrounds the verticle position arm 63. Therefore, any movement of the verticle position arm 63 horizontally moves the block surrounding it and correspondingly, moves the horizontal position block 47 attached to it in a horizontal manner. Verticle movement of this connection is similarly controlled by verticle movement of the horizontal block 47 of these two blocks by movement of the opposing position arm, which means, this intersection of blocks can be positioned exactly at any of the intersection points between columns and rows that locates cassettes in the cassette library. Attached to this intersection of position blocks 47 and 64 is the video cassette playback device 20. Therefore, by positioning the blocks with the playback device attached at any of the column row intersections, any of the cassettes may be inserted into the cassette playback device 20.

FIG. 5 shows the mechanical elements located at each of the column row intersections. Each cassette, FIG. 3, 28, is held by a cassette holder; FIG. 3, 27, attached to a cassette holder shaft 39. This shaft has the end not holding the cassette inserted into a cassette selector sleeve 34. This sleeve also holds a linkage completion pin 30 which is held by a completion pin slide holder 26 that allows the completion pin to traverse the width of the holder. This holder is connected to a completion pin control shaft 23 that is inserted into the row solenoid 16 and holds all of the completion pin holders 26 for a given row of cassettes in the cassette library. Activation of the row solenoid 16 by the system control unit according to the binary selection number causes the solenoid to draw the completion pin control shaft 23 into the solenoid 16 and, therefore, causes all of the completion pins 30 of the given row to be drawn into the cassette selector sleeves 34 of that row thus causing a connection to be established between the selector sleeves 34 and the cassette holder shafts 39 for all the sleeves and holders located in that row. This connection continues until the row solenoid 16 is deactivated at which time a spring, FIG. 3, 44, removes the control shaft 23 from the solenoid 16 and therefore, the completion pin from the sleeves 34. The selector sleeves 34 are further attached to a selector sleeve control arm 80 by a pin 85 located in a slot in sleeve control arm 80. All of the sleeve control arms 80 in any given column are connected to a verticle shaft that spans the complete height of the given column, FIG. 3, 76, and is attached at one end to the cassette selector gear 73 which in turn is in conjunction with the cassette selector motor 19 which receives directional activation from the system control unit 10 according to the binary code number designating the column location of the selected cassette. Upon receiving activation from the system control, the cassette selector motor 19 rotates in a clockwise manner thus moving the cassette selector gear 73 in a counterclockwise rotation and further moving all of the sleeve control arms 80 attached to the shaft 76 and representing the selector sleeve controls of all of the cassette selector sleeves 34 in a given column in a similar counterclockwise direction. All of the cassette selector sleeves in the given column being attached to these sleeve control arms 80, therefore, move forward by converting the rotary motion of the control arms to linear motion along the cassette holder shafts 39. The connection created by the completion pin 30 between the cassette selector sleeve 34 and the cassette holder shaft 39 designating the row location of the selected cassette coupled with the cassette selector sleeve 34 motion designating the column location of the selected cassette causes the selected cassette located at this intersection between row and column to be moved forward and inserted into the cassette playback device 20 which has already been pre-positioned to accept the cassette. The insertion of the cassette into the playback device 20 becomes operational and playback of the cassette proceeds. Upon completion of cassette, it is rewound and the system control 10 is signaled. The tape selector motor 19 is activated in a counterclockwise rotation reversing the movement of the gear 73, shaft 76, arm 80, sleeve 34, and cassette holder 39 thus removing the cassette from the playback device and returning the cassette library to its original condition. The row solenoid 16 is deactivated and the completion pin 30 is removed from the cassette holder 39. The entire selection system is now ready to receive additional selection requests.

In an alternative to the embodiment that has been described, the coin unit 11, FIG. 2, the title board 13, FIG. 2, and the customer selector 12, FIG. 2, being of the same design and performing the same function as has been described in the previous description, are located together in a separate enclosure from the enclosure housing the cassette library and connected to the system control unit 10, FIG. 2, by wiring. The selector of this unit is connected, as in the previous description, to the selector memory 14, FIG. 2. The coin unit 11, FIG. 2, of this unit is connected to the system control 10, FIG. 2. This locational placement allows the customer selector to be placed in a more convenient customer location.

It is understood that the size of the video cassette library presented is for illustration only and to increase the size of the library, one need only add additional rows of cassettes or increase the total number of columns of cassettes, or both. In either case, the functions of the elements that comprise the Cassette Selection Machine remain the same. The capacity of the control memory would be increased to reflect the increased library size but system modifications necessary would be known to one skilled in the art. The base concepts of selecting a singular cassette from a group of cassettes remain unchanged, as does the ability to provide playback and display of the selected cassette.

What I claim is:

1. An automatic coin operated video cassette library retrieval and playback system for user controlled retrieval and playback of pre-recorded video cassettes comprising:

an enclosure housing a group of video cassettes which comprise said video cassette library, each of said cassettes being individually identifiable by a unique ordinate selection code that defines the location of each cassette, a coin unit means for receiving, screening, and tabulating coins deposited by the library user, selection notification means for alerting the user that selection may proceed, keyboard entry means for enabling the specification and entry of video cassette title selections and transmitting them to a system control selection memory in four bit binary data blocks comprising the said ordinate selection code, said data blocks serving to identify every cassette in the library by row and column position, motor and solenoid actuated cassette retrieval means for retrieving cassettes specified by said binary data blocks, central control and processing means for effecting said coin tabulation, notifying the user of the number of selections paid for, receiving said binary data blocks, and activating the cassette retrieval means in response to receipt of said data blocks to retrieve selected video cassettes in serial fashion, and to rewind and return said video cassettes to the cassette library upon completion of playback, and audio and video reproducing means to facilitate the presentation to the user of sound and video information derived from said video cassettes during playback.

* * * * *